United States Patent [19]

Becker et al.

[11] 4,094,634

[45] June 13, 1978

[54] ANIONIC AND NONIONIC EMULSIFIED OPTICAL BRIGHTENER SUSPENSION WITH A HYDROTROPIC AGENT

[75] Inventors: Carl Becker, Basel; Jacques Wegmann, Bettingen; Andres Schaub, Biel-Benken, all of Switzerland

[73] Assignee: Ciba Geigy AG, Basel, Switzerland

[21] Appl. No.: 797,374

[22] Filed: May 11, 1977

Related U.S. Application Data

[60] Division of Ser. No. 574,042, May 2, 1975, Pat. No. 4,042,320, which is a continuation-in-part of Ser. No. 506,775, Sep. 17, 1974, Pat. No. 3,997,828.

[30] Foreign Application Priority Data

| May 9, 1974 | Switzerland | 6374/74 |
| Sep. 2, 1974 | Switzerland | 11896/74 |
| Dec. 18, 1974 | Switzerland | 16894/74 |

[51] Int. Cl.$^2$ .................... D06L 3/12; D06P 1/44
[52] U.S. Cl. ..................... 8/1 W; 252/301.21
[58] Field of Search ............... 8/1 W; 252/301.21

[56] References Cited

U.S. PATENT DOCUMENTS

| 3,347,617 | 10/1967 | Ulrich et al. | 8/1 W |
| 3,558,316 | 1/1971 | Keberle | 252/301.21 X |
| 3,900,608 | 8/1975 | Dierkes et al. | 252/301.21 X |
| 3,997,828 | 8/1976 | Becker et al. | 8/79 |

FOREIGN PATENT DOCUMENTS

2,246,843   4/1973   Germany .................... 252/301.21

*Primary Examiner*—John Kight, III
*Attorney, Agent, or Firm*—Wenderoth, Lind & Ponack

[57] ABSTRACT

Described are aqueous, stable, highly concentrated, finely dispersed, flowable preparations of dyestuffs and optical brighteners insoluble to difficultly soluble in water, which preparations have a low content of dispersing agent and a particle size smaller than 10 μ, particularly smaller than 2 μ, characterized in that these preparations contain at least 10 percent by weight of water, at least 30 percent by weight of a finely dispersed dyestuff or optical brightener insoluble to difficultly soluble in water, and a mixture consisting of at most 10 percent by weight of an anion-active dispersing agent, at most 5 percent by weight of a nonionic dispersing agent and at most 35 percent by weight of a hydrotropic agent, as well as, optionally, further additives which preparations are useful for the dyeing, printing and optical brightening of textile material in a conventional manner or for the production of printing pastes having an aqueous base or a water-in-oil-emulsion base which printing pastes are useful for the printing of carrier materials, particularly paper with application of dyestuffs or optical brighteners suitable for transfer printing and use of the printed carrier materials in the transfer printing process on textile materials.

12 Claims, No Drawings

ANIONIC AND NONIONIC EMULSIFIED OPTICAL BRIGHTENER SUSPENSION WITH A HYDROTROPIC AGENT

This is a division of application Ser. No. 574,042, filed May 2, 1975, now U.S. Pat. No. 4,042,320 which in turn is a continuation-in-part of our copending application Ser. No. 506,775 filed Sept. 17, 1974, now U.S. Pat. No. 3,997,828.

The invention relates to aqueous preparations of dyestuffs or optical brighteners insoluble to difficultly soluble in water, to processes for the production of these preparations, to the use thereof for the preparation of aqueous printing pastes, as well as to the use of these for the printing of carrier materials and to their use in transfer printing, and also to the use of these preparations for the dyeing or optical brightening of textile materials, and to the printed carrier materials as well as to the textile material printed or optically brightened by means of these preparations in the transfer printing process, or dyed, printed or optically brightened by means of these preparations in the dyeing or printing process.

Commercial forms of dyestuffs or optical brighteners insoluble to difficultly soluble in water are known both as liquid preparations and as powder preparations. The latter have the disadvantage that they have to be firstly dispersed in water before application; the former have the disadvantage that they require large amounts of dispersing agent, in most cases over 30 percent by weight, and contain very little dyestuff, of the order of about 20 percent by weight, or very little optical brightener, of the order of about 5 to 25 percent by weight. There was therefore a need, particularly with regard to the production of printing pastes for printing of carrier materials and to the use of these in transfer printing, to produce a commercial form of, in particular, dyestuffs which is directly ready for use, and which contains on the one hand a relatively small amount of dispersing agent and on the other hand a large amount of dyestuff; and which, furthermore, has a low electrolyte content, in order to thus render possible a more general application, for the preparation of printing pastes, also of thickening agents that are sensitive to electrolytes.

Aqueous preparations of dyestuffs or optical brighteners insoluble to difficultly soluble in water have now been found which do not have the disadvantages mentioned. These new aqueous preparations have a low content of dispersing agents and of electrolytes, but a high concentration of dyestuff or optical brightener as defined, are stable, finely dispersed and flowable, and contain dyestuffs insoluble to difficultly soluble in water, especially disperse dyestuffs or vat dyestuffs, or optical brighteners insoluble to difficultly soluble in water, of which the particle size is smaller than 10 μ, particularly smaller than 2 μ. These preparations are characterised in that they preferably contain not less than 10 percent by weight, especially 20 to 30 percent by weight, of water, at least 30 percent by weight, especially 35 to 65 percent by weight, preferably 40 to 60 percent by weight, of a finely dispersed dyestuff or optical brightener insoluble to difficultly soluble in water, and a mixture consisting of at most 10 percent by weight, especially 0.1 to 5 percent by weight, of an anion-active dispersing agent, at most 5 percent by weight, especially 1 to 3 percent by weight, of a nonionic dispersing agent and at most 35 percent by weight, particularly 5 to 20 percent by weight, of a hydrotropic agent, optionally together with further additives.

Suitable dyestuffs insoluble to difficultly soluble in water are, in particular, disperse dyestuffs. Mention may be made, for example, of the foundation dyestuffs of Celliton ® and Palanil ® dyestuffs of BASF, of Cibacet ® and Terasil ® dyestuffs of Ciba-Geigy, of Artisil ® and Foron ® dyestuffs of Sandoz, and of Duranol ® dyestuffs of ICI, to mention just a few. Various chemical classes of dyestuffs are applicable, such as nitro dyestuffs, amino-ketone dyestuffs, ketoneimine dyestuffs, methine dyestuffs, nitrodiphenylamine dyestuffs, quinoline dyestuffs, aminonaphthoquinone dyestuffs, coumarin dyestuffs and, in particular, anthraquinone dyestuffs and azo dyestuffs, such as monoazo and disazo dyestuffs.

Further suitable dyestuffs are vat dyestuffs. Typical representatives belong, for example, to the following chemical classes: indigoid dyestuffs; anthraquinone vat dyestuffs, including also the anthrimide dyestuffs, anthraquinoneacridone dyestuffs, anthraquinonethiazole dyestuffs as well as anthraquinonylazine dyestuffs and, finally, derivatives of condensed ring systems; naphthalene dyestuffs; perylene dyestuffs; sulphurised carbazoles and quinone dyestuffs.

It is understood that the type of dyestuff within this given definition is to a great extent governed by the field of application for which these aqueous dyestuff preparations according to the invention are intended. If they are to be employed, for example, for the production of printing pastes and subsequent use in transfer printing, then the employed dyestuffs insoluble to difficultly soluble in water will be those, within the limits of the given definition, which are suitable for the transfer printing process, especially disperse dyestuffs which are converted at atmospheric pressure, at between 150° and 220° C, to the extent of at least 60% in less than 60 seconds into the vapour state, which are stable to heat and which can be transferred undecomposed.

Such disperse dyestuffs are, for example, the monoazo dyestuffs of the formula

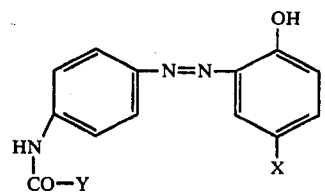

wherein X and Y each represent an alkyl radical having 1 to 4 carbon atoms,

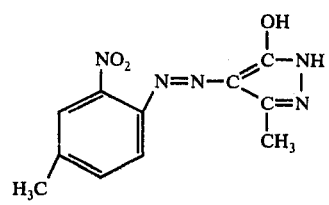

and

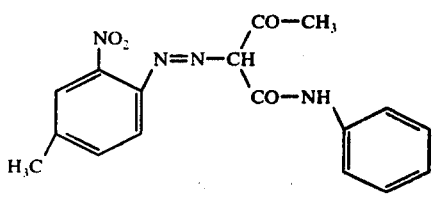

and, in particular, the quinophthalone dyestuff of the formula

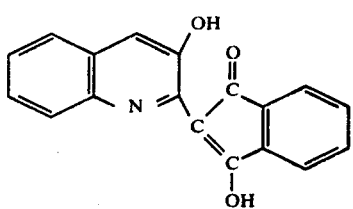

and the anthraquinone dyestuffs of the formulae

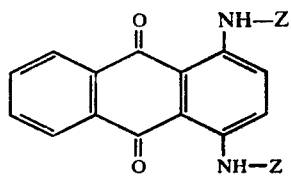

(Z = alkyl having 1 to 4 carbon atoms),

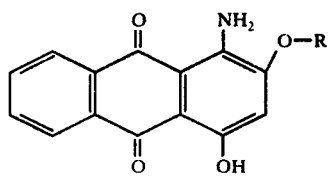

(R = alkyl or aryl)

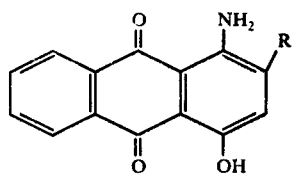

(R = Hal)

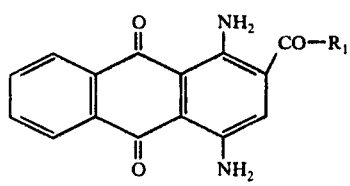

($R_1$ = alkyl having 3 to 4 carbon atoms),

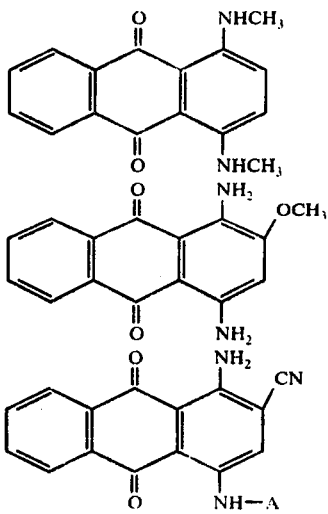

(A = alkyl or aryl), as well as brominated or chlorinated 1,5-diamino-4,8-dihydroxyanthraquinones.

Also suitable however are reactive disperse dyestuffs that can be used in the transfer printing process, such as the dyestuffs of the formulae

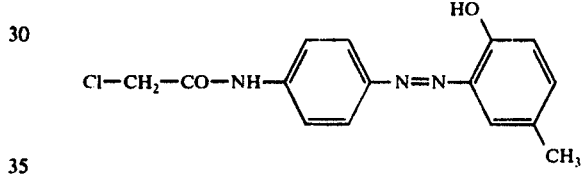

and

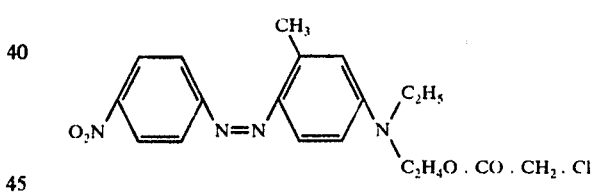

A further important factor is the choice of dyestuffs in the case of dyestuff combinations, for only those dyestuffs that are similar in their transfer characteristics should be combined in the transfer printing process.

Suitable optical brighteners insoluble to difficultly soluble in water are, in particular, the following classes of compounds with their nonionic substitution products:

(a) pyrazolines such as, for example, 1-(4-sulphamoylphenyl)-3-(4-chlorophenyl)-pyrazoline or 1-(4-methylsulphonylphenyl)-3-(4-chlorophenyl)-pyrazoline;

(b) coumarins such as 3-phenyl-7-(3-methylpyrazol-1-yl)-coumarin, 3-phenyl-7-(3-phenyl-4-methyl-1,2,3-triazol-2-yl)-coumarin or 3-(4-chloro-1,2-pyrazol-1-yl)-7-(3-phenyl-4-methyl-1,2,3-triazol-2-yl)-coumarin;

(c) mono- and bis-benzoxazoles such as naphthaline-1,4-bis-benzoxazole-(2), thiophene-2,5-bis-benzoxazole-(2), ethylene-1,2-bis-(5-methylbenzoxazole)-(2), 2-(4-cyanostyryl)-5,6-dimethylbenzoxazole, 4-(5,7-dimethylbenzoxazol-2-yl)-4'-phenylstilbene;

(d) benzimidazoles such as furan-2,5-bis-(N-methylbenzimidazole)-(2);

(e) aryltriazoles such as 2-(4-chloro-2'-cyano-stilben-4'-yl)-naphtho-(1',2':4,5)-1,2,3-triazole;

(f) naphthoxazoles such as 2-(ω-styryl)-naphtho-(1,2-d)-oxazole;

(g) pyrenes such as 2-pyrenyl-4,6-dimethoxy-1,3,5-triazine;

(h) naphthalimides such as 4-methoxy-N-methylnaphthalimide or 4,5-diethoxy-N-methylnaphthalimide;

(i) bis-ethylene-aryls such as 1,4-bis-(2-cyanostyryl-ω)benzene, 4,4'-bis-(2-methoxystyryl-ω)-biphenyl.

Furthermore, it is possible to use in the aqueous brightener preparations also mixtures of different types of optical brighteners within the limits as defined.

Suitable anion-active dispersing agents are, e.g.: sulphated primary or secondary, purely aliphatic alcohols of which the alkyl chain contains 8 to 18 carbon atoms, e.g. sodium lauryl sulphate, potassium-α-methyl stearyl sulphate, sodium tridecyl sulphate, sodium oleyl sulphate, potassium stearyl sulphate, or the sodium salts of coconut oil alcohol sulphates; sulphated, unsaturated higher fatty acids or fatty acid esters, such as oleic acid, elaidic acid or ricinoleic acid, or lower alkyl esters thereof, e.g. ethyl ester, propyl ester or butyl ester, and the oils containing such fatty acids, such as olive oil, castor oil or rape oil; addition products of 1 to 20 moles of ethylene oxide with fatty amines, fatty acids or aliphatic alcohols having 8 to 20 carbon atoms in the alkyl chain, which addition products are converted into an acid ester by means of an organic dicarboxylic acid such as maleic acid, malonic acid or succinic acid, preferably however with an inorganic polybasic acid such as o-phosphoric acid, or, in particular, sulphuric acid, for example such addition products with stearylamine, oleylamine, stearic acid, oleic acid, lauryl alcohol, myristyl alcohol, stearyl alcohol or oleyl alcohol, such as the ammonium salt of sulphated lauryl alcohol triglycol ether, or of 1 to 5 moles of ethylene oxide with alkylphenols, such as the acid sulphuric acid ester of the addition product of 2 moles of ethylene oxide with 1 mole of p-nonylphenol, the acid sulphuric acid ester of the addition product of 1.5 moles of ethylene oxide with 1 mole of p-tert.octylphenol, the acid sulphuric acid ester of the addition product of 5 moles of ethylene oxide with 1 mole of p-nonylphenol, the acid phosphoric acid ester of the addition product of 2 moles of ethylene oxide with 1 mole of p-nonylphenol, the acid maleic acid ester of the addition product of 2 moles of ethylene oxide with 1 mole of p-nonylphenol; sulphated esterified polyoxy compounds, for example sulphated, partially esterified polyvalent alcohols, such as the sodium salt of the sulphated monoglyceride of palmitic acid; instead of sulphates, it is also possible to use esters with other polyvalent mineral acids, e.g. phosphates; primary and secondary alkylsulphonates of which the alkyl chain contains 8 to 20 carbon atoms, e.g. ammonium decylsulphonate, sodium dodecylsulphonate, sodium hexadecanesulphonate and sodium stearylsulphonate; alkylarylsulphonates, such as alkylbenzenesulphonate having a straight-chain or branched-chain alkyl chain containing at least 7 carbon atoms, e.g. sodium dodecylbenzenesulphonate, 1,3,5,7-tetramethyloctylbenzenesulphonate, sodium octadecylbenzenesulphonate; such as alkylnaphthalenesulphonates, for example, sodium-1-isopropylnaphthalene-2-sulphonate; sodium dibutylnaphthalenesulphonate; or such as dinaphthylmethanesulphonates, for example the disodium salt of di(6-sulphonaphthyl-2)-methane; sulphonates of polycarboxylic acid esters, for example sodium dioctyl sulphosuccinate, sodium dihexylsulphophthalate; the sodium, potassium, ammonium, N-alkyl-, N-hydroxyalkyl-, N-alkoxyalkyl- or N-cyclohexylammonium or hydrazinium and morpholinium salts of fatty acids having 10 to 20 carbon atoms, which are designated as soaps, such as lauric, palmitic, stearic acid, or oleic acid of naphthenic acids, of resinic acids, such as abietic acid, e.g. the so-called rosin soap; esters of polyalcohols, particularly mono- or diglycerides of fatty acids having 12 to 18 carbon atoms, e.g. the monoglycerides of lauric, stearic, palmitic or oleic acid, as well as the fatty acid esters of sugar alcohols, such as sorbitol, sorbitans and saccharose, for example sorbitan monolaurate (Span 20), sorbitan palmitate (Span 40), sorbitan stearate (Span 60), sorbitan oleate (Span 80), sorbitan sesquiolate, sorbitan trioleate (Span 85), and the hydroxyethylation products thereof (Tween).

Anion-active dispersing agents which have proved particularly favourable are condensation products of aromatic sulphonic acids with formaldehyde, such as condensation products from formaldehyde and naphthalene sulphonic acids, or from formaldehyde, naphthalenesulphonic acid and benzenesulphonic acid, or a condensation product from crude cresol, formaldehyde and naphthalenesulphonic acid, and lignin sulphonates and polyphosphates. It is also possible to employ mixtures of anionic dispersing agents, such as, e.g., a mixture of the condensation product from crude cresol, formaldehyde and naphthalenesulphonic acid with lignin sulphonate.

Normally, the anionic dispersing agents are in the form of their alkyl salts, their ammonium salts or their water-soluble amine salts. It is advantageous to use qualities having a low content of foreign electrolytes.

Nonionic dispersing agents are, for example: addition products of, e.g., 5 to 50 moles of alkylene oxides, especially ethylene oxide (with some ethylene oxide units being able to be replaced by substituted epoxides such as styrene oxide and/or propylene oxide), with higher fatty acids, or with saturated or unsaturated alcohols, mercaptans or amines having 8 to 20 carbon atoms, or with alkylphenols or alkylthiophenols of which the alkyl radicals contain at least 7 carbon atoms; reaction products from higher-molecular fatty acids and hydroxyalkylamines; these can be prepared, for example, from higher-molecular fatty acids, preferably such ones having about 8 to 20 carbon atoms, e.g. caprylic acid, stearic acid, oleic acid and, in particular, from the mixture of acids embraced by the collective term "coconut oil fatty acid", and from hydroxyalkylamines such as triethanolamine or preferably diethanolamine, as well as from mixtures of these amines, with the reaction being so performed that the molecular quantity ratio between hydroxyalkylamine and fatty acid is greater than 1, for example 2:1. Such compounds are described in the U.S. Pat. No. 2,089,212; condensation products of alkylene oxide, especially ethylene oxide, with some ethylene oxide units being able to be replaced by substituted epoxides, such as styrene oxide and/or propylene oxide.

Fatty alcohol polyglycol ethers have proved particularly advantageous, especially those having more than 20 moles of ethylene oxide, such as cetyl-stearyl alcohol etherified with 25 moles of ethylene oxide, stearyl-oleyl alcohol etherified with 80 moles of ethylene oxide and oleyl alcohol etherified with 20 to 80 moles of ethylene oxide. Furthermore, phenol ethers such as p-nonylphenol etherified with 9 moles of ethylene oxide, ricinoleic acid ester having 15 moles of ethylene oxide and hydroabietyl alcohol etherified with 25 moles of ethylene oxide are also very suitable.

These nonionic dispersing agents advantageously have a low electrolyte content. Mixtures of such agents are possible and in some cases have synergetic effects.

By hydrotropic agents used in the aqueous preparations according to the invention are meant those agents capable of converting the dispersion of the dyestuffs or optical brighteners insoluble to difficultly soluble in water into a stable deflocculated form, without in the process a chemical reaction occurring between the dyestuff or the optical brightener and the hydrotropic substance. These compounds should be watersoluble. Suitable substances having these properties are, for example: hydrotropic salts such as the sodium salt of benzoic acid, the sodium salt of benzenesulphonic acid, the sodium salt of p-toluenesulphonic acid or the sodium salt of N-benzylsulphanilic acid. Compounds which have proved particularly advantageous in this connection are, however, nitrogen-containing compounds, such as urea and derivatives thereof, for example dimethylurea or guanidine chloride, or acid amides such as acetamide and propionamide and derivatives thereof, especially N-methylacetamide.

With the application according to the invention of the hydrotropic substance in combination with dispersions of the dyestuffs or optical brighteners as defined, a stabilisation of the deflocculated dispersion is obtained without any actual dissolving of the dyestuffs or optical brighteners occurring.

By virtue of this combination according to the invention, namely of the anion-active and nonionic dispersing agent together with the hydrotropic agent in the given amounts, it is possible to obtain aqueous preparations which have on the one hand a low content of dispersing agent and, on the other hand, a high content of dyestuff or of optical brightener, and which are characterised in particular by their stability both in the hot state and in the cold state in a temperature range of between about minus 10° C and plus 60° C; by a storage-stability of several months; by free flowability; by their finely dispersed form; and by their low viscosity in the range of about 10 to 1000 cp/20° C.

In consequence of the high proportion by weight of dyestuff or optical brightener, the aqueous preparations according to the invention are very compact and provide a saving in space. A reduction of the space required for storage and dispatch and in transport is therefore ensured.

If desired or required, these preparations can contain further additives for improving properties, such as hygroscopic agents, e.g. glycols or sorbitols; antifrost agents, e.g. ethylene glycol or monopropylene glycol; antimicrobics; fungicides, e.g. aqueous formalin solution; antifoaming agents and agents improving viscosity.

As a result of the presence of about 10% of sorbitol, there can moreover be obtained a fully satisfactory redispersibility of the completely dried-out paste.

It is obvious that in the case of brightener preparations there are used only such anionic and nonionic dispersing agents and hydrotropic agents which have no noticeably disadvantageous effects on the fluorescence of the brighteners (e.g. so-called quenching effects). Furthermore, on subsequent application in 'Foulardtherm' (hot padding) processes, these auxiliaries must be able to withstand the short exposure to heat at 150° to 220° C without yellowing.

By virtue of their high content of dyestuff or optical brightener, these preparations are greatly superior to the liquid preparations hitherto available commercially, since, on account of their smaller content of dispersing agents and extenders, they can be processed into low-viscous printing inks having an adequate concentration of dyestuff or of optical brightener. In the printing on paper using solvent-free, purely aqueous printing processes, by means of roller-printing, Flexoprinting and, in particular, rotary-screen-printing machines, highly concentrated preparation systems having a low content of dispersing agents are required. Since paper, compared with textile materials, has a clearly reduced absorption capacity for printing inks, the recipes suitable for direct printing on textiles, especially in the case of deep shades, cannot be used.

The new aqueous preparations are produced, for example, by a process in which the dyestuff or optical brightener as defined is mixed and ground in water with at least one of the mentioned anion-active and/or nonionic dispersing agents, an operation which is carried out, e.g., in a ball mill or sand mill, with the remaining constituents being added before, during or even after the grinding process, so that a preparation having a particle size smaller than 10 $\mu$, especially smaller than 2 $\mu$, is obtained.

The new aqueous dyestuff preparations can be used, advantageously after dilution with water, for the dyeing or printing of textile materials by the continuous or discontinuous method of operation. Depending on the dyestuffs used in the preparations, the widest variety of textile materials can be dyed or printed therewith, such as polyester or cellulose triacetate materials or mixtures of fibres by application of preparations containing disperse dyestuffs.

In the preparation also of printing pastes for traditional textile printing, it is of advantage to employ preparations having the lowest possible content of dispersing agent, since the disperse dyestuffs at present available contain large amounts of dispersing agent, which have to be washed out after fixing of the dyestuff and thus unnecessarily contaminate the waste water.

Since the preparations according to the present invention have an electrolyte content that is low compared with that of commercial preparations of disperse dyestuffs, the thickeners used for the production of the said printing pastes can be sensitive to electrolytes. In this connection, thickeners in particular having a polyacrylic base have proved especially valuable.

A preferred possibility of application is moreover that these dyestuff preparations can be used, with the employment of thickeners, for the production of printing pastes having an aqueous base or a water-in-oil-emulsion base, which printing pastes are used for the printing of carrier materials which, in their turn, can be used in the transfer printing process on textile materials.

The carrier materials that are printed with such printing pastes are known, and consist advantageously of a flexible sheet material that is preferably dimensionally stable, such as a strip, band or sheet, preferably having a smooth surface. These carrier materials must be stable to heat, and they are made of the most varied types of materials, particularly non-textile materials, such as metal, e.g. an aluminium or steel sheet; or they consist of a continuous strip of stainless steel, plastics or paper, preferably of a clean, non-lacquered cellulose parchment paper, which is optionally coated with a film of vinyl resin, ethylcellulose, polyurethane resin or Teflon.

The optionally filtered printing pastes or printing inks are applied to the carrier material, in places or over the whole surface, by, for example, spraying, coating or, advantageously, printing. There can also be applied to the carrier material a multicoloured pattern, or the carrier material can be printed with a ground shade and thereafter successively with identical or different designs. After application of the printing paste to the carrier material, this is dried, e.g. with the aid of a warm flow of air or by infra-red irradiation.

The carrier materials can be printed also on both sides, whereby it is possible to select different colours and/or designs for the two sides. In order to avoid the use of a printing machine, the printing pastes can be sprayed onto the carrier materials by means of, for example, a spray gun. Particularly interesting effects are obtained when simultaneously more than one shade is printed or sprayed on the carrier material. Specific designs can be obtained, e.g., by the use of stencils, or artistic designs can be applied by brush. If the carrier material is printed, then the most diverse printing processes may be employed, such as high-pressure processes (e.g. letter-press printing, flexographic printing), gravure printing (e.g. roller printing), screen printing (e.g. rotary printing or film printing) or electrostatic printing processes.

The transfer is effected in the usual manner by the action of heat. For this purpose, the treated carrier materials are brought into contact with the materials to be printed, especially textile materials, and are held at about 120° to 210° C until the defined dyestuffs applied to the carrier material have been transferred to the textile material. As a rule, 5 to 60 seconds are sufficient to achieve this.

The action of heat can be applied by various known methods, for example by passage over a hot heating cylinder, by passage through a tunnel-shaped heating zone, or by means of a heated roller, advantageously together with a pressure-exerting, heated or unheated counter roller, or by means of a hot calender, or with the aid of a heated plate, optionally under vacuum, which devices are preheated to the required temperature by steam, oil, infra-red irradiation or microwaves, or which are located in a preheated heating chamber.

After completion of the heat treatment, the printed material is separated from the carrier. The material requires no aftertreatment, neither a steam treatment to fix the dyestuff, nor a washing to improve the fastness properties.

The new aqueous optical brightener preparations are used, preferably and advantageously after dilution with water, for the optical brightening of textile materials by, e.g., the exhaust process, hightemperature exhaust process and 'Forlardtherm' process. Further suitable dispersing agents or other auxiliaries can optionally be added for stabilisation of the liquor and/or for obtainment of carrier effects.

The widest variety of textile materials are suitable such as polyester materials, polyamide, polyacrylonitrile, cellulose acetate and cellulose triacetate, and these materials can be in the most diverse stages of processing. It is moreover possible for these preparations to be used for the production of printing pastes, which are employed either for conventional brightening of, in particular, textile materials, or for printing of carrier materials, such as especially paper, which in their turn are used in the transfer printing process on textile materials.

A further application for the optical brightener preparations according to the invention is, finally, in spinning-solution brightening.

The following examples illustrate the invention without limiting its scope to them. 'Parts' denote parts by weight, and temperatures are given in degrees Centigrade.

A. PRODUCTION OF THE PREPARATIONS

Example 1

500 parts of the coarse crystalline dry dyestuff of the formula

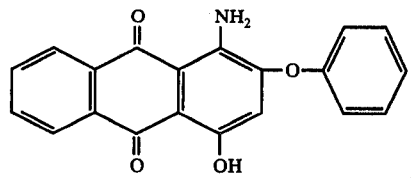

are slowly introduced, with intensive stirring (Dissolver or Lodige-Mischer (mixers)), into a pre-prepared solution of 25 parts of an anion-active dispersing agent (sodium salt of naphthalene sulphonic acid condensed with formaldehyde), 10 parts of a fatty alcohol polyglycol ether as nonionic dispersing agent (cetyl/stearyl alcohol etherified with 25 moles of ethylene oxide), 10 parts of a 35% aqueous formalin solution, 100 parts of 1,2-propylene glycol as antifrost agent and 118 parts of urea, as hydrotropic stabilising agent, and the whole is then homogenised for about 1 hour and deaerated.

This 55% dyestuff mixture is then ground in a sand mill, or preferably in a closed ball mill (bead mill), by means of Ottawa sand and Siliquarzit balls (1 mm diameter), respectively, for about 10 hours at a temperature of 20° to 50°. After this time there is obtained a dispersion of which an overwhelming majority of particles are smaller than 5 μ. The finely ground dispersion is subsequently diluted to give a dyestuff content of 50% (yield: 1000 parts) by the addition of a further 90 parts of water, which if necessary contains an amount (to be determined beforehand) of carboxymethylcellulose as thickening agent, in order to bring the final viscosity into the ideal range of 500 to 1000 cP (Brookfield viscosimeter; 30 r.p.m.).

The free-flowing aqueous preparation remains completely unchanged even throughout a storage time of several months, and withstands without impairment temperatures of −15° to +40°.

If, instead of the dyestuff, the anion-active dispersing agent, the nonionic dispersing agent and the hydrotropic agent given in the above example, there are used identical parts of the constituents shown in the following Table I, with otherwise the same procedure, then likewise there are obtained storage-stable, freeflowing, aqueous dyestuff preparations having analogous properties, of which the dyestuff content and respective grinding time are governed by the dyestuff concerned, and are between 40 and 60 percent by weight and 5 to 10 hours, respectively.

Table

| Example No. | Dyestuff | Anion-active dispersing agent | Nonionic dispersing agent | Hydrotropic agent |
|---|---|---|---|---|
| 2 | (1,4-bis(methylamino)anthraquinone structure) | lignin sulphonate | fatty alcohol polyglycol ether (stearyl/oleyl alcohol etherified with 80 moles of ethylene oxide) | acetamide |
| 3 | (quinoline/indandione structure with OH) | polyphosphate (Calgon®) | phenol ether (p-nonylphenol etherified with 9 moles of ethylene oxide) | urea |
| 4 | (1-amino-2-cyano-4-anilino anthraquinone structure) | condensation product from about 2 moles of naphthalenesulphonic acid and 1 mole of formaldehyde | mixture of 6 parts of ricinoleic acid ester with 15 moles of ethylene oxide with 1 part of fatty alcohol polyglycol ether (cetyl/stearyl alcohol etherified with 25 mol of ethylene oxide) | acetamide |
| 5 | (1,4-diamino-2,3-dichloroanthraquinone structure) | condensation product from naphthalenesulphonic acid, formaldehyde and benzenesulphonic acid | fatty alcohol polyglycol ether (oleyl alcohol etherified with 20 moles of ethylene oxide) | acetamide |
| 6 | (CH₃-C(=O)-HN-C₆H₄-N=N-C₆H₃(OH)(CH₃) structure) | lignin sulphonate | hydroabietyl alcohol etherified with 25 moles of ethylene oxide | dimethylurea |
| 7 | (1,4-diamino-2-methoxy anthraquinone structure) | mixture of 1 part of condensation product from crude cresol, formaldehyde and naphthalenesulphonic acid with 1 part of lignin sulphonate | fatty alcohol polyglycol ether (cetyl/stearyl alcohol etherified with 25 moles of ethylene oxide) | dimethylurea |
| 8 | (1,5-bis(benzoylamino)anthraquinone structure) | condensation product from 2 moles of naphthalenesulphonic acid and 1 mole of formaldehyde (low salt content) | fatty alcohol polyglycol ether (cetyl/stearyl alcohol etherified with 25 moles of ethylene oxide) | urea |
| 9 | mixture of dyestuffs (% = % by wt)<br>Example 1 38%<br>Example 2 47.5%<br>Example 3 14.5% | condensation product from about 2 moles of naphthalenesulphonic acid and 1 mole of formaldehyde | fatty alcohol polyglycol ether (cetyl/stearyl alcohol etherified with 25 moles of ethylene oxide) | urea |
| 10 | (1-amino-2-chloro-4-hydroxyanthraquinone structure) | condensation product from about 2 moles of cresol, 0.2 mole of 2-naphthol-6-sulphonic acid and 3 mol of formaldehyde | " | guadinine chloride |

Table-continued

| Example No. | Dyestuff | Anion-active dispersing agent | Nonionic dispersing agent | Hydrotropic agent |
|---|---|---|---|---|
| 11 | 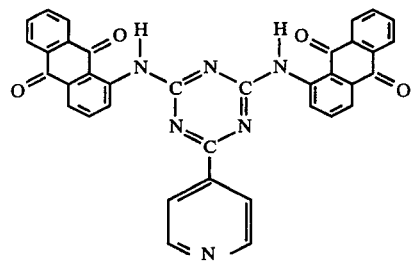 | poly-2-naphthyl-methane-sulphonic acid | " | N-methyl-acetamide |

Example 12

500 parts of the dried and pulverised press cake of dichloro-indanthrone are stirred into a solution of 130 parts of urea, 10 parts of sodium dinaphthylmethane sulphonate, 20 parts of a condensation product of stearyl/cetyl alcohol with 25 moles of ethylene oxide, in 100 parts of monopropylene glycol and 240 parts of water, and the whole is ground, with the addition of 2000 parts of glass balls of 1 mm diameter, until the particle size is essentially about 1 to 2 microns. The preparation is then separated from the balls.

There is obtained a free-flowing, storage-stable dyestuff preparation.

Example 13

500 parts of the crude dyestuff of the formula

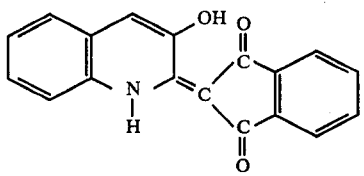

are ground together with a solution of 10 parts of a condensation product of naphthalenesulphonic acid and formaldehyde, 20 parts of the reaction product of p-nonylphenol and 9 moles of ethylene oxide, 130 parts of urea, 100 parts of ethylene glycol and 370 parts of water with 2000 parts of sand until the particle size is around 1 to 2 microns, and the sand is then removed.

There is obtained a pourable stable dyestuff preparation.

EXAMPLE 14

480 parts of the coarse crystalline dry dyestuff of the formula

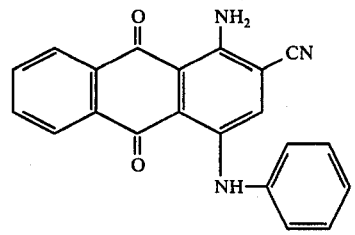

are slowly introduced, with intensive stirring (Dissolver or Lödige Mischer (mixers)), into a pre-prepared solution of 24 parts of an anion-active dispersing agent (sodium naphthalene sulphonate condensed with formaldehyde), 10 parts of a fatty alcohol polyglycol ether as a nonionic dispersing agent (cetyl/stearyl alcohol etherified with 25 moles of ethylene oxide), 10 parts of 35% aqueous formalin solution, 100 parts of 1,2-propylene glycol as an antifrost agent and 124 parts of urea, as a hydrotropic stabilising agent, in 172 parts of water, and the whole is homogenised for about 1 hour and deaerated.

The approx. 52% dyestuff mixture is then ground in a sand mill, or preferably in a closed ball mill, by means of Ottawa sand and Siliquarzit balls (1 mm diameter), respectively, for about 10 hours at a temperature of 20° to 50°. After this time there is obtained a dispersion of which the overwhelming majority of particles are smaller than 5 μ. The finely ground dispersion is subsequently diluted to give a dyestuff content of 48% (yield: 1000 parts) by the addition of a further 80 parts of water which, if necessary, contains an amount (to be determined beforehand) of carboxymethylcellulose as a thickening agent, in order to bring the final viscosity into the ideal range of 500 to 1000 cP (Brookfield viscosimeter; 30 r.p.m.). The free-flowing aqueous preparation remains completely unchanged even after a storage time of several months, and withstands without impairment temperatures of −15° to +40°.

EXAMPLE 15

400 parts of the coarse crystalline dry dyestuff of the formula are slowly introduced, with intensive stirring (Dissolver or Lödige-Mischer [mixers]), into a pre-prepared solution of 20 parts of an anion-active dispersing agent (sodium naphthalene sulphonate condensed with formaldehyde), 20 parts of a fatty alcohol polyglycol ether as a nonionic dispersing agent (cetyl/stearyl alcohol etherified with 25 moles of ethylene oxide), 10 parts of 35% aqueous formalin solution, 100 parts of 1,2-propylene glycol as an antifrost agent and 150 parts of urea, as a hydrotropic stabilising agent, in 190 parts of water, and the whole is then homogenised for about 1 hour and deaerated.

This 45% dyestuff mixture is subsequently ground in a sand mill, or preferably in a closed ball mill, by means of Ottawa sand and Siliquarzit balls (1 mm diameter), respectively, for about 10 hours at a temperature of 20° to 50°. After this time there is obtained a dispersion of which an overwhelming majority of particles are smaller than 5 μ. The finely ground dispersion is diluted to give a final dyestuff content of 40% (= 1000 parts) by the addition of a further 110 parts of water containing if necessary an amount (to be determined beforehand) of carboxymethylcellulose as a thickening agent, in order to bring the final viscosity into the ideal range of 500 to 1000 cP (Brookfield viscosimeter; 30 r.p.m.). The free-flowing aqueous preparation remains completely unchanged even after a storage time of several months, and withstands without impairment temperatures of −15° to +40°.

EXAMPLE 16

482 parts of the coarse crystalline dry dyestuff of the formula

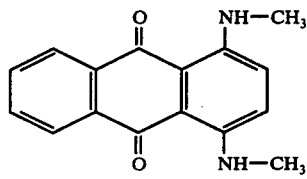

are slowly introduced, with intensive stirring (Dissolver or Lödige-Mischer [mixers]), into a pre-prepared solution of 20 parts of an anion-active dispersing agent (sodium naphthalene sulphonate condensed with formaldehyde), 15 parts of a fatty alcohol polyglycol ether as a nonionic dispersing agent (cetyl/stearyl alcohol etherified with 25 moles of ethylene oxide), 10 parts of 35% aqueous formalin solution, 100 parts of 1,2-propylene glycol as an antifrost agent and 120 parts of urea, as a hydrotropic stabilising agent, in 145 parts of water, and the whole is then homogenised for hour 1 hour and deaerated.

This 54% dyestuff mixture is then ground in a sand mill, or preferably in a closed ball mill, by means of Ottawa sand and Siliquarzit balls (1 mm diameter), respectively, for about 10 hours at a temperature of 20° to 50°. After this time there is obtained a dispersion of which the overwhelming majority of particles are smaller than 5 μ. The finely ground dispersion in diluted to give the final dyestuff content of 48.2% by the addition of a further 108 parts of water containing if necessary an amount (to be determined beforehand) of carboxymethyl cellulose as a thickening agent, in order to thus bring the final viscosity into the ideal range of 500 to 1000 cP (Brookfield viscosimeter; 30 r.p.m.). The free-flowing aqueous preparation remains completely unchanged even after a storage time of several months, and withstands without impairment temperatures of −15° to +40°.

EXAMPLE 17

150 parts of a yellow dispersion according to Example 14,
350 parts of a red dispersion according to Example 1,
300 parts of a blue dispersion according to Example 15, and
200 parts of a blue dispersion according to Example 16 are homogenised in a stirring vessel.

There are obtained 1000 parts of a black formulation having a viscosity in the range of 500 to 1000 cP (Brookfield viscosimeter; 30 r.p.m.).

The free-flowing. highly concentrated aqueous paste remains completely unchanged even after a storage time of several months, and withstands without impairment temperatures of −15° to +40°.

EXAMPLE 18

445 parts of the coarse crystalline dry dyestuff of the formula

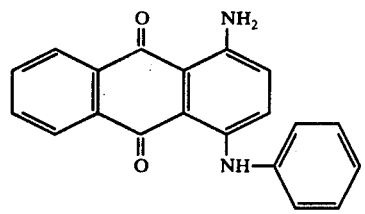

are slowly introduced, with thorough stirring (Dissolver or Lödige-Mischer [mixers]), into a pre-prepared solution of 10 parts of an anion-active dispersing agent (sodium naphthalene sulphonate condensed with formaldehyde), 20 parts of a fatty alcohol polyglycol ether as a nonionic dispersing agent (cetyl/stearyl alcohol etherified with 25 moles of ethylene oxide), 10 parts of 35% aqueous formalin solution, 100 parts of 1,2-propylene glycol as an antifrost agent and 137 parts of urea as a hydrotropic stabilising agent in 205 parts of water, and the whole is then homogenised for about 1 hour and deaerated.

This 48% dyestuff mixture is then ground in a sand mill, or preferably in a closed ball mill, by means of Ottawa sand or Siliquarzit balls (1 mm diameter) for about 10 hours at a temperature of 20° to 50°. There is obtained after this time a dispersion of which an overwheming majority of particles are smaller than 5 μ. The finely ground dispersion is diluted to give a final dyestuff content of 44.5% (= 1000 parts) by the addition of a further 73 parts of water containing if necessary an amount (to be determined beforehand) of carboxymethylcellulose as a thickening agent, in order to thus bring the final viscosity into the ideal range of 500 to 1000 cP (Brookfield viscosimeter; 30 r.p.m.). The free-flowing aqueous preparation remains completely unchanged even after a storage time of several months, and withstands without impairment temperatures of −15° to +40°.

EXAMPLE 19

415 parts of the coarse crystalline dry dyestuff of the formula

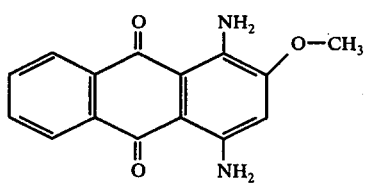

are slowly introduced, with thorough stirring (Dissolver or Lödige-Mischer [mixers]), into a pre-prepared solution of 5 parts of an anion-active dispersing agent (sodium naphthalene sulphonate condensed with formaldehyde), 20 parts of a fatty alcohol polyglycol ether as a nonionic dispersing agent (cetyl/stearyl alcohol etherified with 25 moles of ethylene oxide), 10 parts of 35% aqueous formalin solution, 100 parts of 1,2-propylene glycol as an antifrost agent and 150 parts of urea as a hydrotropic stabilising agent in 222 parts of water, and the whole is homogenised for about 1 hour and deaerated.

This 45% dyestuff mixture is subsequently ground in a sand mill, or preferably in a closed ball mill, by means of Ottawa sand and Siliquarzit balls (1 mm diameter), respectively, for about 10 hours at a temperature of 20° to 50°. There is obtained after this time a dispersion of which an overwhelming majority of particles are smaller than 5 μ. The finely ground dispersion is diluted to give a final dyestuff content of 41.5% (= 1000 parts) by the addition of a further 78 parts of water containing if necessary an amount (to be determined beforehand) of carboxymethylcellulose as a thickening agent, in order to thus bring the final viscosity into the ideal range of 500 to 1000 cP (Brookfield viscosimeter; 30 r.p.m.). The free flowing aqueous preparation remains completely unchanged even after a storage time of several months, and withstands without impairment temperatures of −15° to +40°.

EXAMPLE 20

500 parts of the pure dry active substance of the optical brightener of the formula

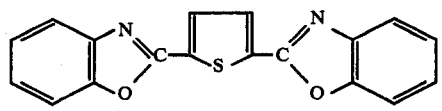

are slowly introduced, with vigorous stirring, into a solution of 17 parts of an anion-active dispersing agent (formaldehyde condensed with sodium naphthalene sulphonate) and 125 parts of urea, as the hydrotropic agent, in 230 parts of water and 50 parts of monopropylene glycol, and the whole is homogenised for about one hour and deaerated. This approx. 53% mixture is then ground in a closed ball mill (DYNO mill, type KDL) by means of Siliquarzit balls (1 mm diameter) for about 4 hours. After this length of time there is obtained a dispersion having a particle size of less than 3 μ. The ground material is diluted to 1000 parts by the addition of a further 50 parts of monopropylene glycol, 10 parts of 35% aqueous formalin solution, as well as 18 parts of a fatty alcohol polyglycol ether as a nonionic dispersing agent (cetyl-stearyl alcohol etherified with 25 moles of ethylene oxide), and the whole is then homogenised for 15 minutes. There is optionally also added an anti-foaming agent. The grinding agent is subsequently removed to leave a free-flowing aqueous preparation having a content of active substance of about 50 percent by weight. This preparation has a low viscosity (<100 cP/20° C). It is therefore advisable to render the thinly liquid dispersion slightly thixotropic by grinding in ≦ 0.75% of Aerosil 200 (Degussa) [final viscosity 500–800 cP/20° C], as a result of which a settling out, even after a storage time of several months, is to a great extent avoided.

If, instead of the optical brightener, anion-active dispersing agent, nonionic dispersing agent and hydrotropic agent given in the above example, there are used identical parts of the constituents shown in the following Table II, with the procedure being otherwise as described, then likewise there are obtained storage-stable, free-flowing aqueous optical brightener dispersions having analogous properties, of which the active-substance content and grinding time are in each case governed by the texture of the crystalline brightener, by the type of mill and by the nature of the grinding agents used, and are between 40 and 60 percent by weight and 3 to 15 hours, respectively.

TABLE II

| Ex. No. | Optical brightener | Anion-active dispersing agent | Nonionic dispersing agent | Hydrotropic agent |
|---|---|---|---|---|
| 21 | H₃C—[benzoxazole]—C—CH=CH—C—[benzoxazole]—CH₃ | sulphonated sulphone mixture of phenol and naphthalene, partially condensed with formaldehyde | fatty alcohol polyglycol ether (stearyl-oleyl-alcohol etherified with 80 moles of AeO) | urea |
| 22 | [structure with piperazine-SO₂-phenyl-pyrazoline-phenyl-Cl] | condensation product from ca. 2 moles of naphthalenesulphonic acid and 1 mole of formaldehyde | " | " |
| 23 | [biphenyl]—CH=CH—[phenyl]—C—[dimethylbenzoxazole] | " | " | N-methyl-acetamide |
| 24 | [bis-benzoxazolyl thiophene] | tetrapotassium-pyrophosphate | hydroabietyl alcohol etherified with 25 moles of ethylene oxide | dimethyl urea |
| 25 | according to Example 23 | polyphosphate (Calgon®) | phenol ether (p-nonyl-phenol etherified with 9 moles of ethylene oxide | moles urea |
| 26 | according to Example 21 | sodium hexametaphosphate NaPO₃)₁₂₋₁₃Na₂O | fatty alcohol polyglycol ether (oleyl alcohol etherified with 80 moles of ethylene oxide) | acetamide |

TABLE II -continued

| Ex. No. | Optical brightener | Anion-active dispersing agent | Nonionic dispersing agent | Hydrotropic agent |
|---|---|---|---|---|
| 27 | [structure: benzimidazole-furan-benzimidazole with N=C–O–C=N linkage and NH groups] | condensation product of formaldehyde with naphthalenesulphonic acid | fatty alcohol polyglycol ether (Cetyl/stearyl alcohol etherified with 25 moles of ethylene oxide | dimethyl urea |
| 28 | according to Example 22 | mixture of 1 part of the condensation product from crude cresol, formaldehyde and naphthalenesulphonic acid with 1 pat of lignin sulphonate/ | hydroabietyl alcohol etherified with 25 mols of ethylene oxide | N-methyl-acetamide |

B. APPLICATION OF THE PREPARATIONS

EXAMPLE 29

Printing pastes are obtained by the mixing, by vigorous stirring, of a dyestuff preparation produced according to Examples 1 to 7 or 9 into an aqueous polyacrylate solution. These printing pastes can be used for printing paper in the rotary screen printing process. The paper thus printed can then be used in the transfer printing process, preferably with application to polyester textile materials, with sharply outlined, deeply coloured printings being obtained.

EXAMPLE 30

100 parts of the dyestuff preparation according to Example 8 are dispersed by stirring in 1900 parts of water. A fabric made from mercerised cotton is impregnated with the liquor thus obtained; the material is squeezed out to leave an increase in weight of 60%, and subsequently dried in a stream of hot air.

The fabric is afterwards impregnated in an aqueous solution containing per liter 20 parts of sodium hydroxide and 40 parts of sodium dithionite at a temperature of 20° C, and the material is then squeezed out to give a 60% increase in weight; it is subsequently steamed in a steamer free from air for 30 seconds, and is then finished by oxidation, rinsing, soaping and drying in the usual manner.

There is obtained a strong, fast yellow dyeing having excellent levelness.

EXAMPLE 31

100 parts of the preparation according to Example 3 are diluted with 1900 parts of water. A polyester fabric is impregnated with the resulting dispersion and then squeezed out to 50% increase in weight; it is dried in a stream of hot air, and additionally thermofixed for 60 seconds at 200°. The yellow dyeing obtained is rinsed and dried; the resulting dyeing is characterised by a solid level appearance and very good fastness properties.

EXAMPLE 32

In each case, 100 parts of the dyestuff preparation according to Examples 3 and 8 are diluted with 1800 parts of water; there is then impregnated therein a mixed fabric made from identical parts of polyester and cotton; the material is squeezed out to 60% increase in weight, dried and thermofixed for 60 seconds at 200°; it is subsequently impregnated in an aqueous bath containing per liter 20 parts of sodium hydroxide and 40 parts of sodium dithionite, then steamed for 60 seconds, oxidised, rinsed, soaped and dried. There is obtained a level yellow tone-in-tone dyeing having very good fastness properties and a solid appearance.

EXAMPLE 33

A printing paste is prepared by stirring 15 parts of a dyestuff preparation according to Example 1 into 85 parts of a 2.5% aqueous solution of a sodium alginate thickening as the stock thickening.

This printing paste of about 8000 cP is applied with a photogravure printing device to paper. The paper thus printed can be used in the transfer printing process, e.g. on polyester textiles. There are obtained sharply outlined level prints having a high intensity of colour.

It is worthy of note that the viscosity of the stock thickening, the consistency of which is very important for a good printing result, is only very slightly changed by the stirring-in of the large amount of dyestuff.

If, instead of the stated dyestuff and the stock thickening mentioned, those given in the following Table III are used in the amount given, then likewise there are obtained printing pastes which can be used on paper or on other suitable intermediate carriers in flat screen printing, in rotary screen printing, in photogravure printing or in relief printing, or in other suitable printing processes, such as spraying, brushing, etc.

TABLE III

| Example | Dyestuff preparation | Stock thickening |
|---|---|---|
| 34 | 15 parts according to Example 2 | 85 parts of a 2.5% aqueous solution of weakly alkaline, anionic carob bean flour derivative |
| 35 | 15 parts according to Example 3 | 85 parts of a 2% aqueous solution of neutral, nonionic, depolymerised guar flour |
| 36 | 15 parts according to Example 4 | 85 parts of a 2% aqueous solution of neutral, nonionic ethylated locust bean flour |
| 37 | 15 parts according to Example 5 | 85 parts of an oil-in-water emulsion with 1.5% carob bean flour |
| 38 | 15 parts according to Example 6 | 85 parts of an 8% aqueous solution of nonionic neutral carob bean flour ether thickening |
| 39 | 15 parts according to Example 7 | 85 parts of a 2.5% aqueous solution of anionic alkaline carob bean flour ether thickening |
| 40 | 15 parts according to Example 9 | 85 parts of a 3.5% aqueous solution of a mixture of carob bean flour ether and starch ether |

TABLE III-continued

| Example | Dyestuff preparation | Stock thickening |
|---|---|---|
| 41 | 15 parts according to Example 1 | 85 parts of a 5% aqueous solution of anionic, weakly alkaline starch ether |
| 42 | 15 parts according to Example 2 | 85 parts of a 2% aqueous solution of carboxymethyl-cellulose |
| 43 | 15 parts according to Example 3 | 85 parts of a 1.25% aqueous solution of hydroxyethyl-cellulose |
| 44 | 15 parts according to Example 4 | 85 parts of an 0.8% aqueous solution of a high polymeric polyacrylic acid |
| 45 | 15 parts according to Example 5 | 85 parts of a 6% aqueous solution of autocross-linking, thickening polymerisate paste based onacrylate |
| 46 | 15 parts according to Example 6 | 85 parts of a 6% aqueous solution of a paste made from copolymer based on maleic acid |
| 47 | 15 parts according to Example 7 | 85 parts of a 6% aqueous solution of carob bean flour ether with colloidal silicic acid |
| 48 | 15 parts according to Example 9 | 85 parts of a 10% aqueous solution of lignin-containing carboxymethylcellulose |
| 49 | 15 parts according to Example 1 | 85 parts of a water-in-oil emulsion with Na-alginate as protective colloid |

EXAMPLE 50

The printing pastes obtained according to Examples 33 to 49 can be printed on textile materials based on polyester, cellulose triacetate, polyamide or polyacrylonitrile, and subsequently dried and fixed by methods normally applied for the individual fibres. Further additives may optionally be added to these printing pastes to improve fixing.

EXAMPLE 51

It is possible, provided that the thickening agents concerned permit it, to mix together the printing pastes obtained according to Examples 33 to 49 in order to obtain specifically desired effects, such as levelness, dyestuff yield or run properties.

EXAMPLE 52

100 parts of the dyestuff preparation according to Example 8 are diluted with 150 parts of water, and the whole is stirred into 750 parts of a thickening consisting of 60 parts of a 10% aqueous starch ether solution, 10 parts of glycerin, 17 parts of potassium carbonate, 4 parts of water and 9 parts of sodium sulphoxylate.

The printing paste thus obtained is printed by means of stencils on a cotton fabric of 120 g/m² in weight, which has been pretreated in the normal manner for printing, dried, and afterwards steamed for 10 minutes at 100°–105° with the exclusion of air and subsequently washed. There is obtained a sharply outlined, deeply coloured print.

EXAMPLE 53

The following preparation is produced: 30 parts of a locust bean flour derivative are mixed with 420 parts of water, and the whole is stirred together with a solution of 500 parts of water and 50 parts of a starch ether. To 7 parts of this preparation there are added, under a high-speed stirrer, 1 part of the dyestuff preparation according to Example 8, 1 part of water and 1 part of a high-boiling spirit, and the whole is then printed, by means of heliogravure rollers, onto a fabric made from cellulose-viscose having a weight per unit are of 250 g/m², and subsequently dried. The material is afterwards impregnated with an aqueous solution containing 40 parts of NaOH, 65 parts of Na-dithionite, 15 parts of borax and 880 parts of water; it is then squeezed out to 100% increase in weight and fixed in a steamer free from air for 35 seconds at 120°; it is finally rinsed cold and then hot and dried. There is obtained a strong, sharply outlined print in a yellow shade.

EXAMPLE 54

150 parts of the dyestuff preparation according to Example 8 are worked into 850 parts of a solution-dispersion of thermoplastic substances, and the whole is applied to a coated paper in the heliogravure process. After drying and, optionally, storage, the paper is brought into contact under pressure for 2 to 10 seconds at 200° with a cotton fabric having a weight per unit area of 120 g/m², which has been normally pretreated for printing. The transferred dyestuff is afterwards fixed analogously to the fixing in Example 53 by means of an NaOH-Na-dithinite solution and finally finished. The result is a strong level yellow printing exactly reproducing the fine details of the engraving.

EXAMPLE 55

100 parts of the dyestuff preparation according to Example 8 are stirred into 900 parts of the preparation described below, and the whole is applied by any desired printing process to a textile article which can be made from natural, regenerated or fully synthetic fibres. After drying, the material is treated in hot air for 5 to 10 minutes at 140° to 150°. There is obtained a printing in a deep shade.

The said preparation is obtained as follows:
 40 parts of water,
 10 parts of condensed alkylpolyglycol ether and
 30 parts of a 3% aqueous carob bean flour ether solution are mixed together; subsequently,
 690 parts of heavy benzene (boiling range 120° to 180°) are worked in with a high-speed stirrer, then
 30 parts of a 30% aqueous diammonium phosphate solution and, finally,
 200 parts of a 40% synthetic resin dispersion based on autocross-linking copolymers having an acrylate base are added.

EXAMPLE 56

50 parts of the dyestuff preparation according to Examples 12 or 13 are stirred into 950 parts of water. There are also added 7 parts of sodium acetate, and a cotton fabric is then pad dyed in this dispersion. The material is squeezed out to 70% liquid absorption; it is dried on a cylinder drying machine at 110° and developed by padding in an aqueous bath containing per liter 30 g of sodium hydrosulphite and 60 g of 10N sodium hydroxide solution; the dyeing is subsequently steamed for 60 seconds, rinsed, oxidised, washed, soaped and dried. There is obtained a solid blue dyeing level on the surfaces and sides. Similarly good results are obtained also by the 2-phase printing process.

EXAMPLE 57

3 parts of a brightener formulation produced according to Example 21 are stirred into about 30,000 parts of water containing 30 parts of a fixing accelerator (nonionic oxyethylation product). 1000 parts of a polyester staple fabric (Dacron 54) are treated in the following manner in the liquor obtained (ratio of goods to liquor 1:30) in a dyeing apparatus that permits temperatures of over 100°:

The temperature of the liquor is raised within 30 minutes to 120°. The fabric is treated at 120° for a further 30 minutes, and the liquor is then cooled within 10 minutes to 70°. The polyester fabric is rinsed cold and dried.

Compared with an untreated fabric, the fabric treated in the manner described shows an increase in the degree of whiteness of 150 units of the CIBA-GEIGY scale of whiteness (see: CIBA-GEIGY Rundschau 1973/1, pages 10 to 25).

EXAMPLE 58

4 parts of a brightener formulation produced according to Example 23 and 1 part of a commercial wetting agent are stirred into 1000 parts of water. A piece of polyester staple fabric (Dacron 54) is padded with the padding liquor thus obtained in such a manner that the liquor absorption is 70% of the weight of the goods. The polyester piece treated in this way is dried at 80° for 10 minutes, and subsequently thermofixed in a thermofixing apparatus for 30 seconds at 200°. Compared with an untreated fabric, the treated fabric shows an increase in the degree of whiteness of 160 units of the CIBA-GEIGY scale of whiteness.

EXAMPLE 59

2 parts of a brightener formulation produced according to Example 22 are stirred into 30,000 parts of water containing 30 parts of a fixing accelerator (nonionic oxyethylation product) and ∼45 parts of 85% formic acid. 1000 parts of a polyacrylonitrile staple fabric (Orlon 75) are treated in the resulting application liquor at pH 3.5 (ratio of goods to liquor 1:30) according to the following procedure: the temperature of the liquor is raised within 30 minutes to 97°; the fabric is treated for a further 30 minutes at this temperature, and then cooled to 70° within 10 minutes. The fabric is rinsed cold and dried.

Compared with the untreated fabric, the fabric treated in the described manner shows an increase in the degree of whiteness of 120 units of the CIBA-GEIGY scale of whiteness.

EXAMPLE 60

3 parts of a brightener formulation produced according to Example 22 are stirred into 30,000 parts of water containing 90 parts of a commercial reducing bleaching agent, e.g. sodium dithionite. 1000 parts of a polyamide 66 woven tricot are treated in the resulting application liquor (ratio of goods to liquor 1:30) according to the following procedure: the temperature of the liquor is raised within 30 minutes to 97°; the tricot is treated at 97° for a further 30 minutes and then cooled to 70° in the course of 10 minutes. The woven tricot piece is rinsed cold and dried.

The woven tricot treated in the described manner shows, compared with an untreated substrate, an increase in degree of whiteness of 140 units of the CIBA-GEIGY scale of whiteness.

EXAMPLE 61

1500 parts of a copolymer which contains 95% of acrylonitrile and 5% of 2-vinylpyridine and has a mean molecular weight of 47,000 are dissolved in 5500 parts of ethylene carbonate, and the solution obtained is filtered and deaerated. Into this solution there is stirred a mixture of 2500 parts of ethylene carbonate and about 1000 parts of water, in which beforehand 1 part of a brightener dispersion formulated according to Example 27 and 7.5 parts of oxalic acid have been added and homogenised. The formed spinning solution is then heated to 70° and is extruded, at a speed of 200 g/min./nozzle through spinning nozzles having 412 holes (0.0076 cm diameter), into a precipitating bath containing a mixture of 75% of water and 25% of ethylene carbonate. The bath temperature is maintained at 60° while the freshly formed fibrils are drawn through the bath to a length of 122 cm. The coagulated tow is drawn out of the bath at a speed of 9.3 m/min. and over two positively driven rollers which are arranged outside the bath and run at a speed of 9.3 m/min. and 44.5 m/min., respectively, so that the tow is stretched in air to the extent of 4.8 times its former length. The tow is then drawn through a stretching bath containing water and 1 to 3% of accumulated ethylene carbonate at a temperature of 100°. The tow is drawn through the bath over a distance of 63.5 cm, as a result of which there is achieved an additional 1.64-fold stretching, so that the overall stretching obtained is 7.7 times the original length. The tension is released and the tow is subsequently passed, over a distance of 63.5 cm, through a bath consisting essentially of water at 90°. The resulting slack tow is squeezed out at a rate of 66 m/min., cut to the desired length of staple, finished and finally dried. In contrast to the severely yellowed untreated fibre, the stable fibre brightened in this manner with 0.33 o/oo of active substance of the optical brightener from Example 8 is pure white.

EXAMPLE 62

A printing paste for rotary screen printing on paper is produced by pre-diluting 0.5 to 1 part of an optical brightener formulated according to Example 20 or 21 with about 9 parts of water, and stirring it into 90 parts of a stock thickening (6% aqueous solution of a paste made from a copolymer based on maleic acid). This printing paste of about 8000 cP is applied in a desired design to paper using a rotary screen printing machine. The dried paper printed in this manner can be used, in the transfer printing process, on polyester textiles (transfer at approx. 210° during 30 seconds). The design printed onto paper is visible after transfer to the polyester textile material by virtue of its pure white effect. The design is particularly effective in rooms illuminated by UV-radiation.

We claim:

1. An aqueous stable, highly concentrated finely dispersed flowable optical brightener composition comprising at least 10% by weight of water, at least 30% by weight of at least one finely dispersed optical brightener insoluble to difficultly soluble in water having a particle size smaller than 10μ and a mixture consisting of at most 10% by weight of an anion-active dispersing agent, at most 5% by weight of a nonionic dispersing agent and at most 35% by weight of a hydrotropic agent capable of converting the optical brightener into a stable deflocculated form.

2. A composition according to claim 1, wherein the optical brightener has a particle size smaller than 2μ.

3. A composition according to claim 1, which contains 0.1 to 5 percent by weight of an anion-active dispersing agent, 1 to 3 percent by weight of a nonionic dispersing agent and 5 to 20 percent by weight of a hydrotropic agent.

4. A composition according to claim 1, which contains 35 to 65 percent by weight of at least one optical brightener therein.

5. A composition according to claim 1, which contains at least 40 to 60 percent by weight of at least one optical brightener therein.

6. A composition according to claim 1, wherein the optical brightener is selected from the group consisting of derivatives of pyrazolines, coumarins, mono- and bis-benzoxazoles, benzimidazoles, aryltriazoles, naphthoxazoles, pyrenes, naphthalimides, and bis-ethylene-aryls.

7. A composition according to claim 1, wherein the anion-active dispersing agent is selected from the group consisting of condensation products of aromatic sulphonic acids with formaldehyde, lignin sulphonates and polyphosphates.

8. A composition according to claim 1, wherein the nonionic dispersing agent is selected from the group consisting of a fatty alcohol polyglycol ether, a phenol ether and a ricinoleic acid ester.

9. A composition according to claim 1, wherein the hydrotropic agent is selected from the group consisting of nitrogen-containing compounds.

10. A composition according to claim 9, wherein the nitrogen-containing compounds are selected from the group consisting of urea and dimethylurea.

11. In a printing paste composition comprising an optical brightener composition and a thickener in an aqueous base or water-in-oil emulsion base, the improvement wherein the optical brightener composition is the optical brightener composition of claim 1.

12. A printing paste according to claim 11, wherein the thickener is a polyacrylic acid thickener.

* * * * *

UNITED STATES PATENT AND TRADEMARK OFFICE
CERTIFICATE OF CORRECTION

PATENT NO. : 4,094,634
DATED : June 13, 1978
INVENTOR(S) : Carl Becker, Jacques Wegmann and Andrea Schaub It is certified that error appears in the above-identified patent and that said Letters Patent are hereby corrected as shown below:

Page 1, first column, third line below the line reading "[60]", change "3,997,828" to -- 3,977,828 --.

Signed and Sealed this

Ninth Day of October 1979

[SEAL]

Attest:

RUTH C. MASON
Attesting Officer

LUTRELLE F. PARKER
Acting Commissioner of Patents and Trademarks